United States Patent [19]

Lissack

[11] 4,316,648
[45] Feb. 23, 1982

[54] BY-DIRECTIONAL BRUSHLESS MOTOR SCANNER

[76] Inventor: Selwyn L. Lissack, 14505 Greenwood La., Tustin, Calif. 92680

[21] Appl. No.: 163,722

[22] Filed: Jun. 27, 1980

[51] Int. Cl.³ .............................................. G02B 27/17
[52] U.S. Cl. ................... 350/6.6; 350/6.91; 362/811
[58] Field of Search ......... 350/6.91, 285, 6.6; 368/140, 142, 4 M, 114; 74/582; 362/147, 259, 811

[56] References Cited

U.S. PATENT DOCUMENTS

| 167,372 | 8/1875 | Wheeler. | |
| 3,433,011 | 3/1969 | Iwasawa et al. | 368/140 |
| 3,679,888 | 7/1972 | Reiback | 362/811 |
| 4,196,461 | 4/1980 | Geary | 362/259 |

FOREIGN PATENT DOCUMENTS 1457995 12/1976 United Kingdom ............... 350/6.91

OTHER PUBLICATIONS

Optical Scanning System Components, Spectra–Jan. 1980, p. 89.
Precision Opts., Applied Optics, 1, May 1980, vol. 19, #9.

Primary Examiner—John K. Corbin
Assistant Examiner—Rebecca D. Gass
Attorney, Agent, or Firm—Lawrence D. Sassone

[57] ABSTRACT

The by-directional brushless electric motor scanner is an optical scanner that reflects a beam of light to a variety of points thereby creating what appears to be continuous geometric and other figures and it comprises a base, a by-directional brushless electric motor coupled to the base, a shaft having a rest position and a shaft axis wherein the shaft is coupled to the motor so that the shaft is rotatable about the shaft axis by the motor, a reflecting surface coupled to the shaft so that the reflecting surface is rotatable and a spring coupled to the base and to the shaft so that the spring will exert a force on the shaft toward the rest position when the shaft is rotated about the shaft axis from the rest position.

12 Claims, 14 Drawing Figures

U.S. Patent  Feb. 23, 1982  Sheet 2 of 4  4,316,648
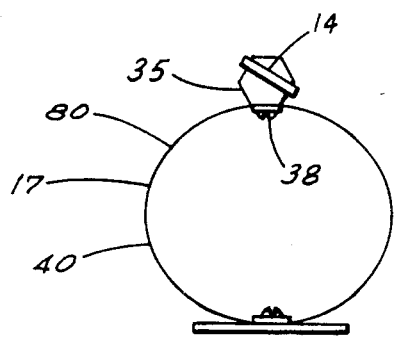
Fig. 5
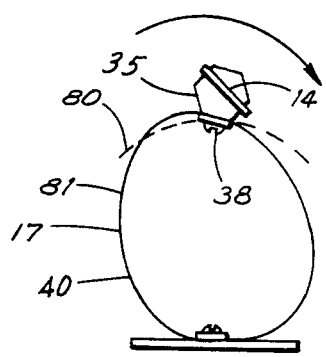
Fig. 6
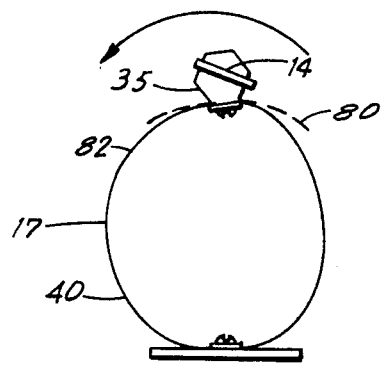
Fig. 7
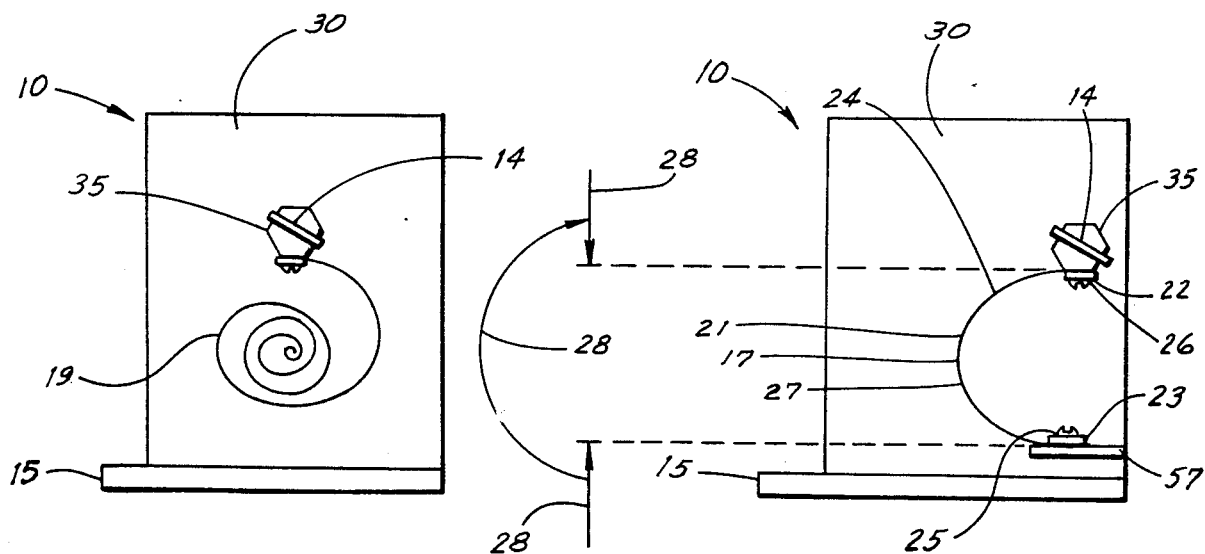
Fig. 8
Fig. 9

BY-DIRECTIONAL BRUSHLESS MOTOR SCANNER

BACKGROUND OF THE INVENTION

Scanners are used in optics either to reflect electromagnetic radiation to a variety of points or to reflect electromagnetic radiation from a variety of points to a desired point such as at a photosensor or photographic plate. The present invention relates to the former type of scanner.

An example of the latter type of scanner is the scanner used to make photographs on the surface of the planet Mars. This latter type of scanner in a sense scans in a straight line resulting in the "photographing" of many points on the line and when it reaches the end of the line, that is its field of view, it repeats the scan on a line below the previous line. All the lines are then put together to obtain a photograph. This type of scanner employs a reflecting surface and means to do each line scan. A by-directional brushless electric motor is not used in the above type of scanner, nor is a spring used to cause rapid oscillation since the line scan is quite slow.

The invention herein is the type of scanner that reflects electromagnetic radiation to a variety of points. One prior art scanner does not utilize a motor and is essentially a galvanometer with a reflecting surface. This type of scanner uses a horseshoe magnet with a coil of wire placed in the magnetic field of the magnet. When a current is introduced to the coil, it will rotate until the restoring torque of the wire or other torque device equals the torque causing the rotation. A reflecting surface is connected to the coil and also rotates. The above device does not use a spring. The galvanometer is described in physics books on electricity and magnetism such as Electricity and Magnetism by Francis Weston Sears.

Another type of scanner consists of a disc with several reflecting surfaces on its edge. The disc is rotated in only one direction and this results in a line scan. The one directional motor, that is, one that rotates in only one direction, is used to rotate the disc. No springs are used in this prior art device.

Another prior art device uses a one directional motor and the motor is itself rotated to obtain scans other than line scans. No springs are used in this prior art device.

It is unknown if there are any patents on the prior art devices described herein. Publications and writings on the other devices of which applicant has copies of accompany this application except for writings on the galvanometer which are contained in various physics text books.

Nothing in the prior art uses a by-directional electric motor with or without a spring to achieve optical scanning.

The invention herein has the ability to reflect a laser beam to a screen, wall or ceiling or any other desired target and the reflected beam will appear continuous and a nearly infinite variety of figures and shapes may be made to appear on any such target including but not limited to figure eights and circles and a variety of figures and shapes which have no name. As such, the invention herein may be used in the field of entertainment, such as places where there is dancing, light shows, and the like or may be used in the field of advertisement in order to attract and keep the attention of people.

SUMMARY OF THE INVENTION

The present invention relates to a by-directional brushless electric motor optical scanner for use in entertainment, advertising and other scientific purposes. One object of the invention is to create a scanner capable of reflecting a beam of light to a target and making the beam of light appear to an observer to be a continuous figure, for example, a figure eight, or a circle, and other random appearing figures. Another object of the invention is to accomplish the above objective with a minimum of parts and a minimum of cost.

The present invention in one embodiment comprises a by-directional brushless electric motor, a shaft having a shaft axis wherein the shaft is coupled to the motor so that the shaft is rotatable about the shaft axis by the motor and a reflecting surface coupled to the shaft so that the reflecting surface is rotatable.

In another embodiment, the invention comprises a base, a by-directional brushless electric motor coupled to the base, a shaft having a rest position and a shaft axis wherein the shaft is coupled to the motor so that the shaft is rotatable about the shaft axis by the motor, a reflecting surface coupled to the shaft so that the reflecting surface is rotatable and a spring coupled to the base and to the shaft so that the spring will exert a force on the shaft towards the rest position when the shaft is rotated about the shaft axis from the rest position.

In various embodiments of the invention the invention further comprises means of supplying alternating current of a variable frequency, duration and amplitude to the motor.

In another embodiment the invention further comprises a spring that has a spring axis, and the spring is disposed around a spring axis and the spring axis is substantially parallel to the shaft axis.

In another embodiment the invention further comprises a spring that has a surface shaped like a part of a cylindrical surface and the spring is orientated with respect to the shaft so that the surface of the spring is substantially parallel to the shaft axis.

In another embodiment, the invention comprises a first by-directional brushless electric motor, a first shaft having a first shaft axis, wherein the first shaft is coupled to the first motor so that the first shaft is rotatable about the first shaft axis by the first motor, a first reflecting surface coupled to the first shaft so that the first reflecting surface is rotatable, a second by-directional brushless electric motor, the second shaft having a second shaft axis wherein the second shaft is coupled to the second motor so that the second shaft is rotatable about the second shaft axis by the second motor and a second reflecting surface coupled to the second shaft so that the second reflecting surface is rotatable and positioned so that a beam of light incident on the first reflecting surface will strike the second reflecting surface after being reflected from the first reflecting surface.

BRIEF DESCRIPTION OF THE DRAWINGS

FIG. 5 is a side view of the spring shown in FIG. 3 and it is the same side view as shown in FIG. 4 except that it illustrates only how the spring is connected and its shape in the rest position.

FIG. 6 is the same view as FIG. 5 except that it illustrates the position of the spring after the shaft has been rotated in the clockwise direction.

FIG. 7 is the same view as shown in FIG. 5 and FIG. 6 except that the shaft has been rotated counter-clockwise, and it illustrates the position of the spring after the shaft has been so rotated.

FIG. 8 is a side view similar to the embodiment shown in FIG. 5 except that the spring is a helical spring.

FIG. 9 is a side view of the scanner and is similar to the view shown in FIG. 4 except that the spring is of the embodiment of having a curved surface.

DETAILED DESCRIPTION

Reference is now made to the accompanying drawings for a better understanding of the invention wherein all the parts are numbered.

Figure 1:
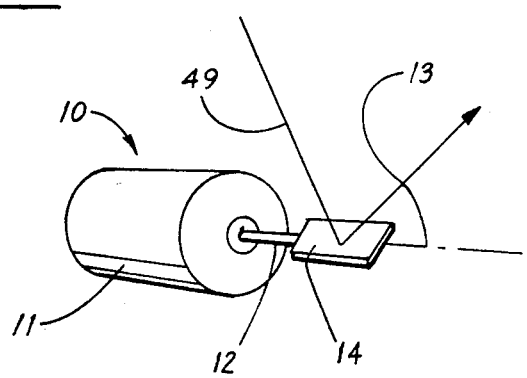
FIG. 1 is a perspective view of the scanner of the embodiment comprising a by-directional brushless electric motor and a shaft and a reflecting surface.
Figure 2:
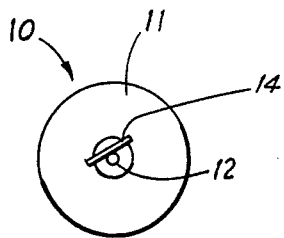
FIG. 2 is a side view of the embodiment shown in FIG. 1.

In the embodiment shown in FIG. 1 a scanner 10 is indicated generally comprising a by-directional brushless electric motor 11, a shaft 12 having a shaft axis 13 wherein the shaft 12 is coupled to the motor 11 so that the shaft 12 is rotatable about the shaft axis 13 by the motor 11 and a reflecting surface 14 coupled to the shaft 12 so that the reflecting surface 14 is rotatable. A side view of the embodiment shown in FIG. 1 is shown in FIG. 2 looking down the shaft axis. In FIG. 1 a beam of light 49 is shown striking the reflecting surface 14 and being reflected from the reflecting surface 14.

The embodiment shown in FIGS. 1 and 2 illustrate one of the more simple embodiments of the invention. The invention herein differs from all other types of scanners in that the invention herein comprises a by-directional brushless electric motor 11. A by-directional motor is one that is reversible and will rotate clockwise and counter-clockwise. A brushless electric motor is one that functions without brushes. By-directional brushless electric motors are commercially available and may be purchased over the counter at various electrical and electronic equipment stores. The by-directional brushless electric motor permits rapid reversals of the motor and the shaft 12 and rapid reversal in direction of rotation of the reflecting surface 14. One directional electric motors cannot be used with this scanner because the reflecting surface 14 must be rotated clockwise and counter-clockwise. Electric motors with brushes cannot be successfully used because such motors will not start and stop as rapidly as the by-directional brushless electric motor will. In addition, motors with brushes have contacts on the shaft and gaps within the motor and will not start if the motor is stopped in certain positions and therefore would result in the stalling of the scanner. A by-directional brushless electric motor 11 can cause the reflecting surface 14 to oscillate at frequencies up to 200 cycles per second. Motors with brushes cannot achieve oscillations anywhere near this frequency. This rapid oscillation will permit the scanner to reflect the light beam 49 against a screen, wall or ceiling with such velocity that the light beam will appear to be a continuous figure such as a circle or a figure eight or other random figures. A motor with brushes would result in the light beam 49 appearing to be a single spot of light as opposed to a figure on a wall or ceiling or screen.

Figure 14:
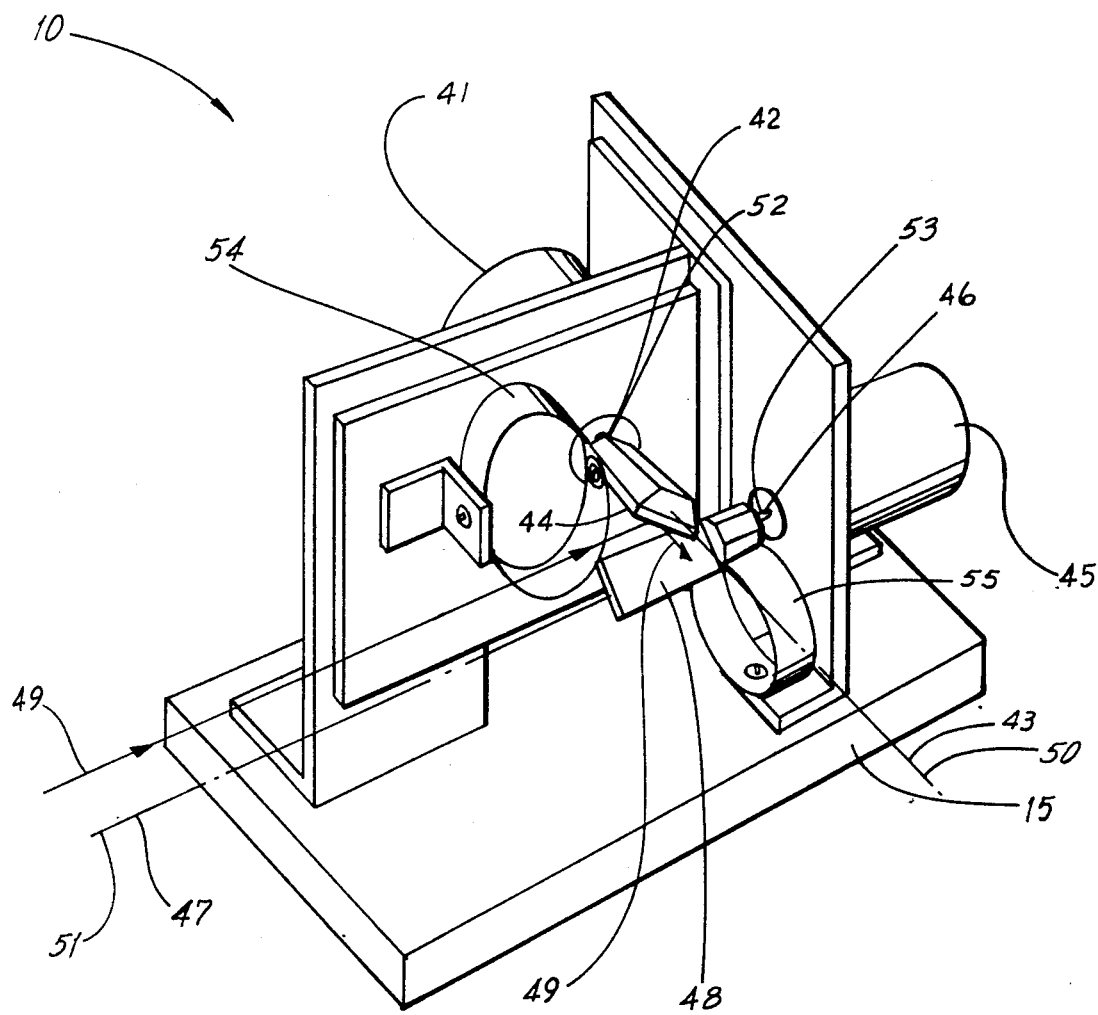
FIG. 14 is a top perspective view of the embodiment having two motors, reflecting surfaces and springs.

The motor 11 may be powered by any means 62 of supplying alternating current to the motor 11. Conventional alternating current power supplies 18 may be used to power the motor. The alternating current will cause the by-directional brushless electric motor to reverse each time that the current reverses thereby causing the shaft 12 to rotate in one direction and then rotate in the other direction, thereby causing the reflecting surface to likewise rotate, thereby resulting in the beam 49 after being reflected from the reflecting surface 14 to appear to be a straight or curved line instead of a spot of light, when it strikes a wall, ceiling, screen or other target, not shown. The principle herein may be illustrated by a flashlight. If one takes a flashlight and shines it on a wall one would see a spot of light. However, if one rapidly moves the flashlight so that the beam moves across a wall from one end of the room to the other, then the beam would not appear to be a spot any longer, but would appear to be a straight or curved line depending on how fast and in what direction the flashlight was moved. If one moved the flashlight back and forth so that the beam went from one side of the wall to the other side of the wall, then it would appear to be a straight line against the wall instead a spot of light. The scanner 10 accomplishes the same result by causing a reflecting surface 14 to rapidly oscillate. The embodiment shown in FIGS. 1 and 2 would result in the light beam 49 appearing to be a straight line after being reflected on a wall, not shown. To obtain more complicated appearing figures than a line, at least one additional motor and reflecting surface must be introduced into the system as shown in FIG. 14 which will be discussed hereinafter.

Figure 3:
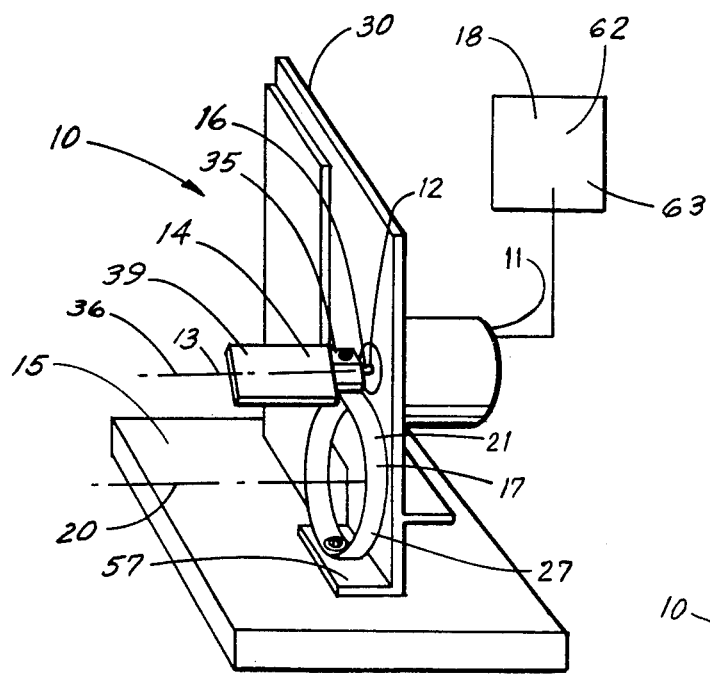
FIG. 3 is a top perspective view of the embodiment comprising a base, motor, shaft, reflecting surface, and spring having a surface shaped like a cylindrical surface.

The scope of use of the scanner 10 is increased by using means 63 of supplying alternating current of a variable frequency, duration and amplitude to the motor as shown in FIG. 3. Varying the frequency, duration and amplitude of the alternating current to the motor 11 results in a greater variety of figures that one is able to transform a light beam 49 into after being reflected by more than one reflecting surface which will be discussed hereinafter.

In the embodiment shown in FIGS. 1 and 2, the reflecting surface may be a polished metal or mirrored surface or any other surface capable of reflecing the light beam 49. The reflecting surface 14 may be glued or screwed directly so the shaft 12 so that it is directly connected to the shaft 12 and will rotate when the shaft 12 rotates. It may be preferable to purchase motors 11 already with a shaft 12 so that a shaft 12 need not have to be connected to the motor 11.

A beam of light 49 shown in FIG. 1 is preferred to be parallel light. Parallel light is preferred so that it may be more easily predicted in which direction the beam of light 49 will be reflected in. It is also preferred that the beam of light 49 originate from a laser not shown, because the laser provides parallel light.

It is also preferred in the embodiment shown in FIGS. 1 and 2 that the reflecting surface 14 be parallel to the shaft axis 13 so that it can be more easily predicted and determined in which direction the beam of light 49 will be reflected in and it is also preferred for simplicity of operation.

Figure 4:
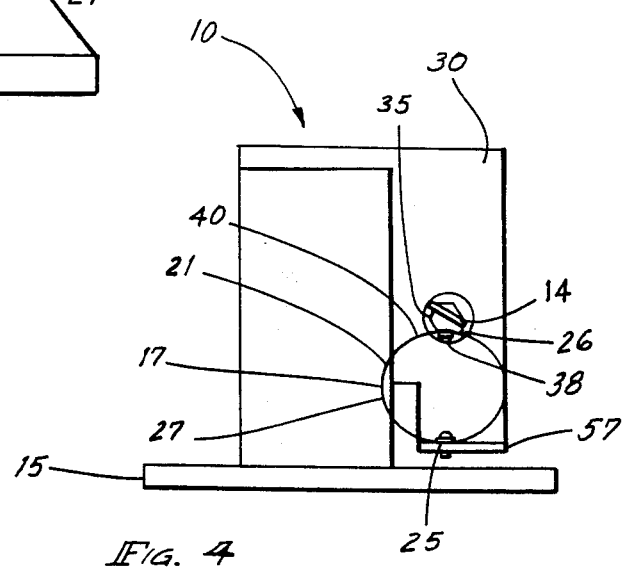
FIG. 4 is a side view of the embodiment shown in FIG. 3.

In the embodiment shown in FIGS. 3 and 4, the scanner 10 is indicated generally comprising a base 15, a by-directional brushless electric motor 11 coupled to the base 15, a shaft 12 having a rest position 16 and a shaft axis 13 wherein the shaft 12 is coupled to the motor 11 so that the shaft 12 is rotatable about the shaft axis 13 by the motor 11, a reflecting surface 14 coupled to the shaft 12 so that the reflecting surface 14 is rotatable, and a spring 17 coupled to the base 15 and to the shaft 12 so that the spring 17 will exert a force on the shaft 12 towards the rest position 16 when the shaft 12 is rotated about the shaft axis 13 from the rest position 16.

The base 15 supports the motor 11 and provides means for supporting the spring 17 and allows the spring 17 to exert a force against the shaft 12. In the embodiment shown in FIGS. 3 and 4 a plate 30 is connected to the base 15 and in turn the motor 11 is connected to the plate 30 and the spring 17 is connected to the plate 30. However, the plate 30 could be an integral part of the base 15. The scanner 10 is more easily assembled by having a separate plate 30 which is connected to the base 15 and then connecting the motor 11 to the plate 30.

The motor 11 may be coupled to the base by a variety of methods. As shown in FIGS. 3 and 4, the motor is first connected to a plate 30 and the plate 30 in turn is connected to the base 15. The manner in which the motor 11 is connected to the plate 13 will depend on the type of motor 11 used. One preferred method is to use a motor that already has a mounting plate with holes in it, not shown, so that the motor can be directly connected to the plate 30 with screws, not shown.

The rest position 16 of the shaft 12 is the position that the shaft will rest in when no current is applied to the motor 11. Thus, the rest position 16 of the shaft 12 is that position when the motor 11 is not exerting any rotational force on the shaft 12.

Some motors 11 may be purchased with shafts 12 of sufficient length so that they may be utilized without any further adaption in order to make them function in the scanner 10. In such cases, the shaft 12 will be the shaft coming out of the motor 11. It is a preferred embodiment that the shaft 12 have a cylindrical shape disposed around the shaft axis 13. In such cases, the shaft axis 13 will be concentric with the shaft 12.

The reflecting surface 14 is described herein above and may be coupled to the shaft 12 so that the reflecting surface 14 is rotatable. In the embodiment shown in FIGS. 3 and 4 the reflecting surface 14 is connected to a mount 35 and the mount 35 is connected to the shaft 12. This facilitates installation of the reflecting surface 14. The mount 35 may be connected to the shaft 12 by putting a hole, not shown, in the mount 35, the hole having a shape and size so that the shaft 12 may be inserted into the hole of the mount. The mount 35 then may be secured to the shaft 12 with glue or other adhesives or by using a set screw, not shown, screwed through the mount 35 until it strikes the shaft 12.

The use of the mount 35 provides the opportunity of coupling the reflecting surface 14 to the shaft 12 by other means other than glue or adhesives. The reflecting surface 14 may be screwed to the mount 35 whereas it would be difficult to screw the reflecting surface 14 directly to a small shaft 12. Such a mount screw 38 is shown in FIGS. 4, 5, 6 and 7.

The spring 17 shown in FIGS. 3 and 4 is also illustrated in FIGS. 5, 6, 7, 10, 13 and 14. The means 62 of supplying alternating current to the motor 11 will cause the shaft 12 to rotate when current is applied to the motor 11. If there were no spring 17, the shaft 12 would tend to keep rotating from its own inertia after the current is turned off. Also when the current is turned off, the shaft 12 would not rotate back to its rest position 16 that the shaft 12 was in prior to the turning on of the current. The spring 17 will stop the shaft 12 from rotating any further in the direction it was being rotated in when the current was turned off. The spring 17 will also cause the shaft 12 to return to the rest position 16 of the shaft 12 that the shaft 12 was in prior to the turning on of the current. The current in alternating current travels in one direction and then actually reverses itself and travels in the other direction. When the current reverses, it will cause the motor 11 to reverse its direction of rotation. The spring 17 will permit the shaft 12 to rotate only a certain amount and when the torque exerted on the shaft 12 by the spring 17 is equal to the torque being exerted on the shaft 12 by the motor 11 then the shaft 12 will cease rotation. If there were no spring, the by-directional brushless electric motor 11 would jerk back and forth when it is supplied with alternating current and it would not rotate in a harmonic manner. In addition, without a spring, it would not be possible to control the rotation of the reflecting surface 14 and it would not be possible to form various figures such as circles or figure eights by reflecting the beam of light 49. The spring 17 exerts a force that is proportional to the angle of rotation of the shaft 12 from the rest position 16 of the shaft 12. The spring 17 will also cause the motion of the shaft 12 to be harmonic. Two motors and reflecting surfaces must be set up as shown in FIG. 14 to obtain various geometric figures. Without the spring 17, the motor 11 and the shaft 12 would merely jerk back and forth in its rotation, and would be very difficult to control.

In the embodiment shown in FIG. 8, a scanner 10 is indicated generally and this view is essentially the view shown in FIG. 4 except that a different type of spring 17 is used. In FIG. 8 the spring is a helical spring 19.

Figure 10:
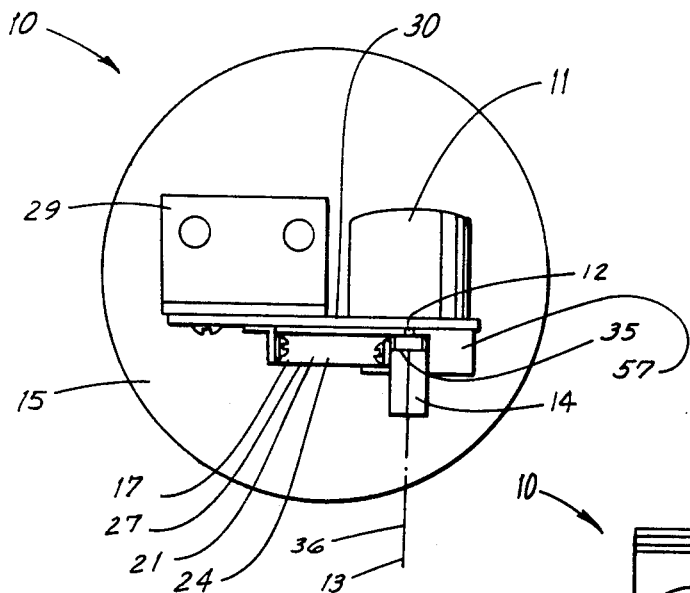
FIG. 10 is a top view of an embodiment similar to the embodiment shown in FIG. 14 and further illustrates a bracket.
Figure 11:
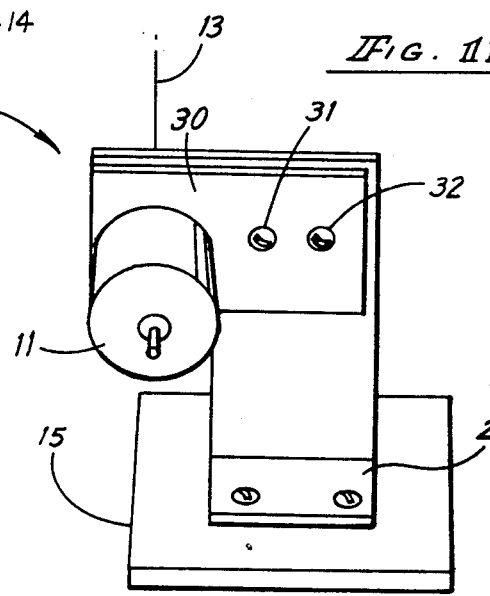
FIG. 11 is a top perspective view of the embodiment shown in FIG. 10 illustrating the bracket.
Figure 13:
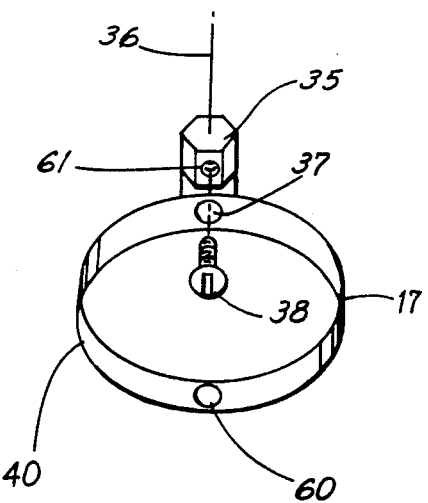
FIG. 13 is a perspective view of the spring that has a cylindrical surface.

In the embodiment shown in FIGS. 3 through 7, the spring 17 has a spring axis 20. In FIGS. 4, 5, 6 and 7, the spring axis 20 would be perpendicular to the plane of the paper that the drawing is on. The spring 17 shown in FIGS. 3 through 7 and also shown in FIGS. 10, 13 and 14 is disposed around the spring axis 20 and the spring axis 20 is substantially parallel to the shaft axis 13. This assures that the spring 17 will be able to exert its maximum restoring force on the shaft 12 when the shaft 12 is rotated from the rest position 16 of the shaft 12. The spring 17 shown in FIGS. 3 through 7, 10, 13 and 14 has a curved surface 21. When the shaft 12 is rotated from the rest position 16 of the shaft 12, the spring 17 will flex and bend and distort from its shape that it was in when the shaft 12 was in its rest position 16. This distortion of the shape of the spring 17 is illustrated in FIGS. 5, 6 and 7. In FIG. 5, the spring 17 is shown when the shaft 12 is in the rest position 16 of the shaft 12. In FIG. 6, the shape of the spring 17 is illustrated when the shaft 12 is rotated clockwise from the rest position 16 of the shaft 12. Likewise, the shape of the spring 17 is illustrated in FIG. 7 when the shaft 12 is rotated in the counter-clockwise direction from the rest position 16 of the shaft 12.

In the embodiment shown in FIG. 9 a spring 17 is shown which has a first end 22 coupled to the base 15 and a second end 23 coupled to the shaft 12. The spring 17 shown in FIG. 9 may be coupled to the base 15 by screwing the spring 17 to the base 15 or to the second bracket 57. The embodiment illustrated in FIG. 9 shows the spring 17 screwed to the second bracket 57. The second bracket 57 could be an integral part of the base 15, however, it is simpler to construct the scanner 10 by making the second bracket 57 a separate part. The second bracket 57 may be connected to the base 15 by screwing it to the base 15. The second end 23 of the spring 17 may be coupled to the shaft 12 by screwing the spring 17 to the shaft 12 or by screwing the spring 17 to the mount 35. The spring 17 shown in FIG. 9 is essentially one-half of the spring 17 shown in FIGS. 3 through 7, 10, 13 and 14. The spring 17 shown in FIG. 9 has a surface 24 shaped like a part of a cylindrical surface. The spring 17 shown in FIG. 9 may be made from a strip of clear plastic having a rectangular shape and then may be bent into the shape shown in FIG. 9 resulting in the spring 17 having a surface 24 shaped like a part of a cylindrical surface. Plastic is elastic and bendable and when the spring 17 is bent into the shape shown in FIG. 9, the spring 17 will exert a force on the shaft 12 and against the base 15, or in the case shown in FIG. 9 against the second bracket 57.

The springs 17 shown in FIGS. 3 through 7, 9, 10, 13 and 14 are orientated with respect to the shaft 12 so that the surface 27 of the spring 17 is substantially parallel to the shaft axis 13. This type of orientation of the spring 17 will allow for maximum use of the restoring force of the spring 17 when the shaft 12 is rotated out of the rest position 16 of the shaft 12. The springs 17 shown in FIGS. 3 through 7, 9, 10, 13 and 14 are clear plastic. The spring 17 is identified by the numbers 54 and 55 in FIG. 14.

The spring 17 shown in FIGS. 3 through 7, 10, 13 and 14 are coupled to the base 15 at a first point 25 on the surface 27 of the spring 17 and the spring 17 is coupled to the shaft 12 at a second point 26 on the surface 27 of the spring 17. The location of the first point 25 and the second point 26 on the surface 27 of the spring 17 will influence and determine the amount of force that the spring 17 will exert on the shaft 12 when the shaft 12 is rotated out of the rest position 16 of the shaft 12. Optimum performance of the spring 17 has been determined to be when the first point 25 on the surface 27 of the spring 17 is at an angle 28 of approximately 160 degrees to 200 degrees with respect to the surface 27 of the spring 17 at the second point 26 on the surface 27 of the spring 17. In other words, if a flat strip of plastic is used to make the spring 17, the strip of plastic for the spring 17 should be bent so that the first end 22 of the spring 17 is rotated 180 degrees with respect to the second end 23 of the spring 17. If the spring 17 is one piece or the first end 22 of the spring 17 is rotated a full 360 degrees with respect to the second end 23 of the spring 17, then the first end 22 and the second end will come into contact and if the spring 17 is plastic and bendable, then the spring 17 will approximate the shape of a circle and the first point 25 on the surface 27 of the spring 17 would be approximately at the opposite side of the circle formed by the spring 17 from the second point 26 on the surface 27 of the spring 17. This is illustrated in FIG. 13 where the holes 60 and 37 are used to connect the spring 40.

Figure 12:
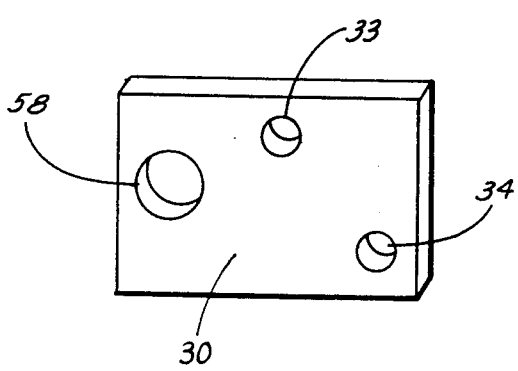
FIG. 12 is a perspective view of the plate.

One method of assemblying the scanner 10 comprises a first bracket 29 connected to the base 15, a plate 30 connected to the first bracket 29 wherein the motor 11 is connected to the plate 30, and a second bracket 57 is connected to the plate 30 wherein the spring 17 is connected to the second bracket 57 as shown in FIGS. 3, 4, 9, 10, 11, 12, 13 and 14. The plate 30 may have a first hole 33 and a second hole 34 and a motor hole 58 as shown in FIG. 12. The motor 11 then may be inserted into the motor hole 58 so that the shaft 12 extends through the plate 30. The motor 11 may be connected to the plate 30 by adhesives or glue or by screwing motor 11 to the plate 30. The plate 30 may be connected to the first bracket 29 by inserting a first screw 31 in the first hole 33 of the plate 30 and a second screw 32 in the second hole 34 of the plate 30 and the plate 30 may thereby be screwed to the first bracket 29. Two screws will prevent the plate 30 from rotating. In the embodiments shown in FIGS. 3 through 10, 13 and 14, the scanner 10 further comprises a mount 35 having the mount axis 36 connected to the shaft 12 so that the mount axis 36 and shaft axis 13 coincide wherein the reflecting surface 14 is connected to the mount 35. The scanner 10 further comprises the mount screw 38 wherein the spring 17 has a hole 37 and the mount 35 has a hole 61 and the spring 17 is connected to the mount 35 by inserting the screw 38 through the hole 37 in the spring 17 and in the hole 61 of the mount 35 which is illustrated in detail in FIG. 13.

For most uses, the reflecting surface 14 will have the flat reflecting surface 39 as shown in FIG. 3. It is easier to predict and determine in which direction a beam of light 49 will be reflected in after striking the reflecting surface 14 if the reflecting surface 14 is flat.

The reflecting surface 14 shown in FIGS. 1 through 10, 13 and 14 are substantially parallel to the shaft axis 13. This makes it easier to predict and determine in which direction a beam of light 49 will be reflected in after striking the reflecting surface 14.

The embodiment of the spring 17 illustrated in FIGS. 3 through 7, 10, 13 and 14 is a spring 17 that has a substantially cylindrical surface 40. It is a preferred embodiment that the cylindrical surface 40 of the spring 17 be that of a right cylindrical surface or a right eliptical surface which will result in the desired force being exerted on the shaft 12 when the shaft 12 is rotated out of the rest position 16 of the shaft 12.

All of the discussion with respect to the embodiment having only one motor 11 and one spring 17 and one reflecting surface 14 are applicable to the embodiment of the scanner 10 having more than one of the foregoing. It is desireable to have more than one motor 11, spring 17, and reflecting surface 14 in order to obtain scans other than a line scan. In order to form various figures such as a figure eight, circle or ellipse it is necessary to have at least two of the foregoing. Such an embodiment is shown in FIG. 14 where a scanner 10 is indicated generally comprising a first by-directional brushless electric motor 41, a first shaft 42 having a first shaft axis 43 wherein the first shaft 42 is coupled to the first motor 41 so that the first shaft 42 is rotatable about a first shaft axis 43 by the first motor 41, a first reflecting surface 44 coupled to the first shaft 42 so that the first reflecting surface 44 is rotatable, a second by-directional brushless electric motor 45, a second shaft 46 having a second shaft axis 47 wherein the second shaft 46 is coupled to the second motor 45 so that the second shaft 46 is rotatable about the second shaft axis 47 by the second motor 45, and a second reflecting surface 48 coupled to the second shaft 46 so that the second reflecting surface 48 is rotatable and positioned so that a beam of light 49 incident on the first reflecting surface 44 will strike the second reflecting surface 48 after being reflected from the first reflecting surface 44. The first reflecting surface 44 is rotatable about a first axis 50 and the second reflecting surface 48 is rotatable about a second axis 51 and the first axis 50 is substantially perpendicular to the second axis 51.

In the embodiment shown in FIG. 14, the first shaft 42 has a rest position 52 and the second shaft 46 has a rest position 53 and the scanner 10 further comprises a base 15 wherein the first motor 41 and second motor 45 are coupled to the base 15, a first spring 54 coupled to the base 15 and to the first shaft 42 so that the first spring 54 will exert a force on the first shaft 42 towards the rest position 52 of the first shaft 42 when the first shaft 42 is rotated about the first shaft axis 43 from the rest position 52, and the second spring 55 coupled to the base 15 and to the second shaft 46 so that the second spring 55 will exert a force on the second shaft 46 towards the rest position 53 of the second shaft 46 when the second shaft 46 is rotated about the second shaft axis 47 from the rest position 53.

The first spring 54 and the second spring 55 shown in FIG. 14 is the same spring shown in FIGS. 3 through 7 and identified by 17. The first motor 41 and the second motor 45 is the same type of motor described heretofore in the discussion of the embodiments shown in FIGS. 1, 2 and 3. The prior discussion of the motor 11 is equally applicable to the first motor 41 and the second motor 45. Likewise, the first shaft 42 and the second shaft 46 are the same as the shaft discussed with respect to FIGS. 1, 2 and 3. In addition, the first reflecting surface 44 and second reflecting surface 48 are the same as the reflecting surface 14 shown in FIGS. 1 through 9 and previously discussed.

All of the prior discussion with respect to the spring 17 shown in FIGS. 3 through 10 and 13 are equally applicable to the embodiment shown in FIG. 14.

Two reflecting surfaces are required to obtain reflections appearing to have two dimensions such as a circle, figure eight or an ellipse. If only one reflecting surface 14 and motor 11 are used, then unless the scanner 10 is somehow otherwise rotated, only a line scan will result. The use of two motors 41 and 45 and two reflecting surfaces 44 and 48 allows one to obtain reflections that will result in two-dimensional figures when observed by an observer. Actually the beam of light 49 is being reflected and due to the rapid oscillation of the reflecting surfaces 44 and 48, the beam of light 49 after being reflected will appear to be a two-dimensional figure when it strikes a wall, ceiling or other target, not shown. It is the use of the first spring 54 and the second spring 55 that stabalizes the motion of the first reflecting surface 44 and second reflecting surface 48 to enable the attainment of two dimensional figures after the beam of light has been reflected. If no springs were used, then the beam of light 49 after being reflected would appear to be random movements when observed when it strikes a target, not shown, and one would not be able to attain specific geometric figures.

The first axis 50 and the second axis 51 are substantially perpendicular to enable one to obtain a two-dimensional figure after the beam of light 49 is reflected by the first reflecting surface 44 and the second reflecting surface 48. A figure on a wall will appear to be a circle when the alternating current supplied to the first motor 41 is ninety degrees out of phase with the alternating current being supplied to the second motor 45 when the alternating current to the first motor 41 and the second motor 45 is of the same frequency. An apparent figure eight can be obtained from the beam of light 49 by doubling the frequency of the alternating current to the first motor 41 compared to the frequency of the second motor 45 or vice versa.

As stated previously herein, the by-directional brushless electric motor 11 is commercially available and the exact characteristics that one would desire depend on the size, shape and use that the scanner 10 will be used for. It is preferred that the motor 11 be suitable for use with means 62 of supplying alternating current in order to obtain the harmonic motion of the reflecting surface 14. This also applies to the first motor 41 and second motor 45.

The shaft 12, 42 and 46 may be of any suitable material and it is preferred that it be made of metal for strength. It is also preferred that the shaft 12 be an integral part of the motor 11 for convenience and installation. The reflecting surface 14 and first reflecting surface 44 and second reflecting surface 48 is preferred to be flat and may be a polished metal or mirrored surface or other surface suitable for reflecting beams of light. The base 15 may be of any suitable material including wood, plastic or metal. Likewise, the various brackets and plates discussed herein may be of any suitable material including wood, plastic or metal.

It is to be understood that the invention is not limited to the exact details of construction, operation or exact materials or embodiments shown and described, as obvious modifications and equivalents will be apparent to one skilled in the art, and the invention is therefore to be limited only by the scope of the appended claims.

What is claimed is:

1. A scanner, comprising:
  a base;
  a by-directional brushless electric motor coupled to the base;
  a shaft having a rest position and a shaft axis wherein the shaft is coupled to the motor so that the shaft is rotatable about the shaft axis by the motor;
  a reflecting surface coupled to the shaft so that the reflecting surface is rotatable; and
  a spring having a surface shaped like part of a cylindrical surface and orientated with respect to the shaft so that the surface of the spring is substantially parallel to the shaft axis and the spring is coupled to the base at a first point on the surface of the spring and the spring is coupled to the shaft at a second point on the surface of the spring so that the spring will exert a force on the shaft towards the rest position when the shaft is rotated about the shaft axis from the rest position.

2. The invention as claimed in claim 1 wherein the surface of the spring at the first point is at an angle of approximately 160 degrees to 200 degrees with respect to the surface of the spring at the second point.

3. The invention as claimed in claim 1 further comprising:
  a first bracket connected to the base;

a plate connected to the first bracket wherein the motor is connected to the plate; and a second bracket connected to the plate wherein the spring is connected to the second bracket.

4. The invention as claimed in claim 3 further comprising a first screw and a second screw wherein the plate has a first hole and a second hole and the plate is connected to the first bracket by inserting the first screw in the first hole and the second screw in the second hole.

5. The invention as claimed in claim 1 further comprising a mount having a mount axis connected to the shaft so that the mount axis and the shaft axis coincide wherein the reflecting surface is connected to the mount.

6. The invention as claimed in claim 5 further comprising a mount screw wherein the spring has a hole and the mount has a hole and the spring is connected to the mount by inserting the screw through the hole in the spring and in the hole of the mount.

7. The invention as claimed in claim 1 wherein the reflecting surface is flat.

8. The invention as claimed in claim 7 wherein the reflecting surface is substantially parallel to the shaft axis.

9. The invention as claimed in claim 1 wherein the spring has a substantially cylindrical surface.

10. The invention as claimed in claim 1 wherein the spring is plastic.

11. A scanner, comprising:

a base;

a first by-directional brushless electric motor coupled to the base;

a first shaft having a rest position and a first shaft axis wherein the first shaft is coupled to the first motor so that the first shaft is rotatable about the first shaft axis by the first motor;

a first reflecting surface coupled to the first shaft so that the first reflecting surface is rotatable;

a second by-directional brushless electric motor coupled to the base;

a second shaft having a rest position and a second shaft axis wherein the second shaft is coupled to the second motor so that the second shaft is rotatable about the second shaft axis by the second motor;

a second reflecting surface coupled to the second shaft so that the second reflecting surface is rotatable and positioned so that a beam of light incident on the first reflecting surface will strike the second reflecting surface after being reflected from the first reflecting surface;

a first spring coupled to the base and to the first shaft so that the first spring will exert a force on the first shaft towards the rest position of the first shaft when the first shaft is rotated about the first shaft axis from the rest position; and a second spring coupled to the base and to the second shaft so that the second spring will exert a force on the second shaft towards the rest position of the second shaft when the second shaft is rotated about the second shaft axis from the rest position.

12. The invention as claimed in claim 11 wherein the first reflecting surface is rotatable about a first axis and the second reflecting surface is rotatable about a second axis and the first axis is substantially perpendicular to the second axis.

* * * * *